(12) United States Patent
Tarui

(10) Patent No.: US 9,403,445 B2
(45) Date of Patent: Aug. 2, 2016

(54) MOTOR CONTROLLER

(71) Applicant: DENSO CORPORATION, Kariya, Aichi-pref. (JP)

(72) Inventor: Jun Tarui, Kariya (JP)

(73) Assignee: DENSO CORPORATION, Kariya (JP)

( * ) Notice: Subject to any disclaimer, the term of this patent is extended or adjusted under 35 U.S.C. 154(b) by 147 days.

(21) Appl. No.: 14/540,429

(22) Filed: Nov. 13, 2014

(65) Prior Publication Data
US 2015/0130387 A1 May 14, 2015

(30) Foreign Application Priority Data

Nov. 14, 2013 (JP) .................................. 2013-235549

(51) Int. Cl.
*B60K 23/00* (2006.01)
*B60L 15/08* (2006.01)
*H02P 6/16* (2016.01)

(52) U.S. Cl.
CPC . *B60L 15/08* (2013.01); *H02P 6/16* (2013.01); *B60L 2220/14* (2013.01); *B60L 2220/16* (2013.01); *B60L 2220/18* (2013.01); *B60L 2240/421* (2013.01); *Y02T 10/644* (2013.01); *Y02T 10/645* (2013.01)

(58) Field of Classification Search
CPC ....................................................... B60K 23/00
USPC ......... 318/264–266, 272, 275, 277, 282, 286, 318/466–469, 626
See application file for complete search history.

(56) References Cited

U.S. PATENT DOCUMENTS

| | | | | |
|---|---|---|---|---|
| 6,043,950 A * | 3/2000 | Kim | ........................ | G11B 19/20 360/73.03 |
| 6,404,157 B1 * | 6/2002 | Simon | ..................... | G05B 15/02 318/264 |
| 7,960,933 B2 * | 6/2011 | Isobe | ....................... | H02P 25/08 318/466 |
| 9,166,520 B2 * | 10/2015 | Nagata | ..................... | H02P 31/00 |

(Continued)

FOREIGN PATENT DOCUMENTS

| | | |
|---|---|---|
| JP | 10-164893 | 6/1998 |
| JP | 2000-18975 | 1/2000 |
| JP | 2012-170213 | 9/2012 |

OTHER PUBLICATIONS

Office Action (3 pages) dated Sep. 16, 2015, issued in corresponding Japanese Application No. 2013-235549 and English translation (4 pages).

*Primary Examiner* — Bentsu Ro
(74) *Attorney, Agent, or Firm* — Nixon & Vanderhye PC

(57) ABSTRACT

A motor controller includes a motor, an encoder, and a control circuit. The motor drives a target object to be controlled. The encoder outputs a pulse signal synchronously with rotation of the motor. The control circuit rotates the motor based on a count value of the pulse signal. The control circuit switches to a sleep mode when making sure that a rotation position of the motor is stable after finishing rotating the motor or when a predetermined time necessary for the rotation position of the motor to be stable elapses after finishing rotating the motor. When a change in the pulse signal during a period of time where the control circuit is in the sleep mode is not smaller than a predetermined amount, the control circuit performs a learning process to learn a reference position of the motor when returning to a wakeup mode from the sleep mode.

5 Claims, 8 Drawing Sheets

(56) References Cited

U.S. PATENT DOCUMENTS

| | | |
|---|---|---|
| 2003/0222617 A1 | 12/2003 | Nakai et al. |
| 2004/0124797 A1 | 7/2004 | Takeuchi et al. |
| 2006/0033464 A1 | 2/2006 | Nakai et al. |
| 2006/0197489 A1 | 9/2006 | Nakai et al. |
| 2007/0182353 A1 | 8/2007 | Kamio et al. |
| 2009/0120222 A1 | 5/2009 | Kimura et al. |
| 2009/0193923 A1 | 8/2009 | Nakai et al. |
| 2011/0068730 A1 | 3/2011 | Nakai et al. |

\* cited by examiner

MOTOR CONTROLLER

CROSS REFERENCE TO RELATED APPLICATION

This application is based on and claims priority to Japanese Patent Application No. 2013-235549 filed on Nov. 14, 2013, the contents of which are incorporated herein by reference.

FIELD

The present invention relates to a motor controller for driving a motor based on a pulse signal which an encoder outputs synchronously with rotation of the motor.

BACKGROUND

Nowadays, there is an increasing trend in automobiles that a mechanical drive system is replaced with an electrical drive system using a motor in order to satisfy needs such as reducing size, increasing ease of assembly, and improving controllability. In an example of such an electrical drive system, a range change mechanism in an automatic transmission of a vehicle is driven using a motor. In this system, an encoder outputs a pulse signal synchronously with rotation of the motor at a predetermined angle, and a gear range is changed to a target range by rotating the motor to a target position corresponding to the target range based on a count value (hereinafter referred to as the "encoder count value") of the pulse signals outputted from the encoder.

In this type of system, when power is turned ON, an energization phase learning process is performed by executing an initial drive of the motor. In the energization phase learning process, a relationship between an energization phase of the motor and the encoder count value is learned. Then, a strike control process is performed to learn a reference position (i.e., limit position) of the motor. In the strike control process, the motor is rotated until the range change mechanism strikes a limit (i.e., wall) of its movable area. The rotation amount (i.e., rotation angle) of the motor is controlled with respect to the encoder count value obtained when the motor is at the reference position. The energization phase learning process and the strike control process are hereinafter sometimes collectively referred to as the "reference position learning process". The reference position learning process is performed each time a microcomputer which controls the motor returns to a wakeup mode (i.e., active mode) from a sleep mode.

JP-A-2012-170213 discloses a technique to reduce the number of times the reference position learning process is performed. According to the technique, the reference position learning process is not performed when the output signal of the encoder does not change during a period of time where the microcomputer is in a sleep mode. In contrast, when the output signal of the encoder changes during a period of time where the microcomputer is in a sleep mode, the microcomputer switches to the wakeup mode from the sleep mode at that time. In this case, if it is determined that only one of A-phase and B-phase signals changes, a correction process is performed so that the encoder count value can be corrected by one. In contrast, if it is determined that both the A-phase and B-phase signals change, the reference position learning process is performed.

It is noted that even after the microcomputer finishes rotating the motor, the rotation position of the motor may be displaced a little by a detent mechanism, which keeps the range change mechanism at a position corresponding to each gear range, so that the output signal of the encoder may be changed accordingly. In the technique disclosed in JP-A-2012-170213, the microcomputer switches to the sleep mode after finishing rotating the motor. Therefore, if the microcomputer switches to the sleep mode just after finishing rotating the motor, it is likely that the output signal of the encoder will be changed by the detent mechanism after the microcomputer switches to the sleep mode. In this case, if both the A-phase and B-phase signals are changed by the detent mechanism, the reference position learning process is performed. Therefore, the number of times the reference position learning process is performed cannot be reduced effectively. In addition, in the technique disclosed in JP-A-2012-170213, the microcomputer switches to the wakeup mode from the sleep mode each time the output signal of the encoder changes. Accordingly, power consumption may be increased.

SUMMARY

In view of the above, it is an object of the present disclosure to provide a motor controller for effectively reducing the number of times a reference position learning process is performed in a system in which a motor is driven and rotated based on an output signal of an encoder.

According to an aspect of the present disclosure, a motor controller includes a motor, an encoder, and a control circuit. The motor drives a target object to be controlled. The encoder outputs a pulse signal synchronously with rotation of the motor. The control circuit rotates the motor based on a count value of the pulse signal. The control circuit switches to a sleep mode when making sure that a rotation position of the motor is stable after finishing rotating the motor or when a predetermined time necessary for the rotation position of the motor to be stable elapses after finishing rotating the motor. When a change in the pulse signal during a period of time where the control circuit is in the sleep mode is not smaller than a predetermined amount, the control circuit performs a reference position learning process to learn a reference position of the motor by rotating the motor when returning to a wakeup mode from the sleep mode.

In this configuration, the control circuit switches to the sleep mode when making sure that the rotation position of the motor is stable after finishing rotating the motor or when the predetermined time necessary for the rotation position of the motor to be stable elapses after finishing rotating the motor. Thus, even when the rotation position of the motor is displaced a little by a detent mechanism after the control circuit finishes rotating the motor, and the output signal of the encoder is changed accordingly, the microcomputer can switch to the sleep mode after the output signal is changed. Therefore, it is possible to reduce a risk that the output signal of the encoder is changed during the period of time where the control circuit is in the sleep mode. Accordingly, the number of times the reference position learning process is performed can be reduced effectively. Further, after switching to the sleep mode, the control circuit does not always switch to the wakeup mode each time the output signal of the encoder is changed. Accordingly, power consumption can be reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
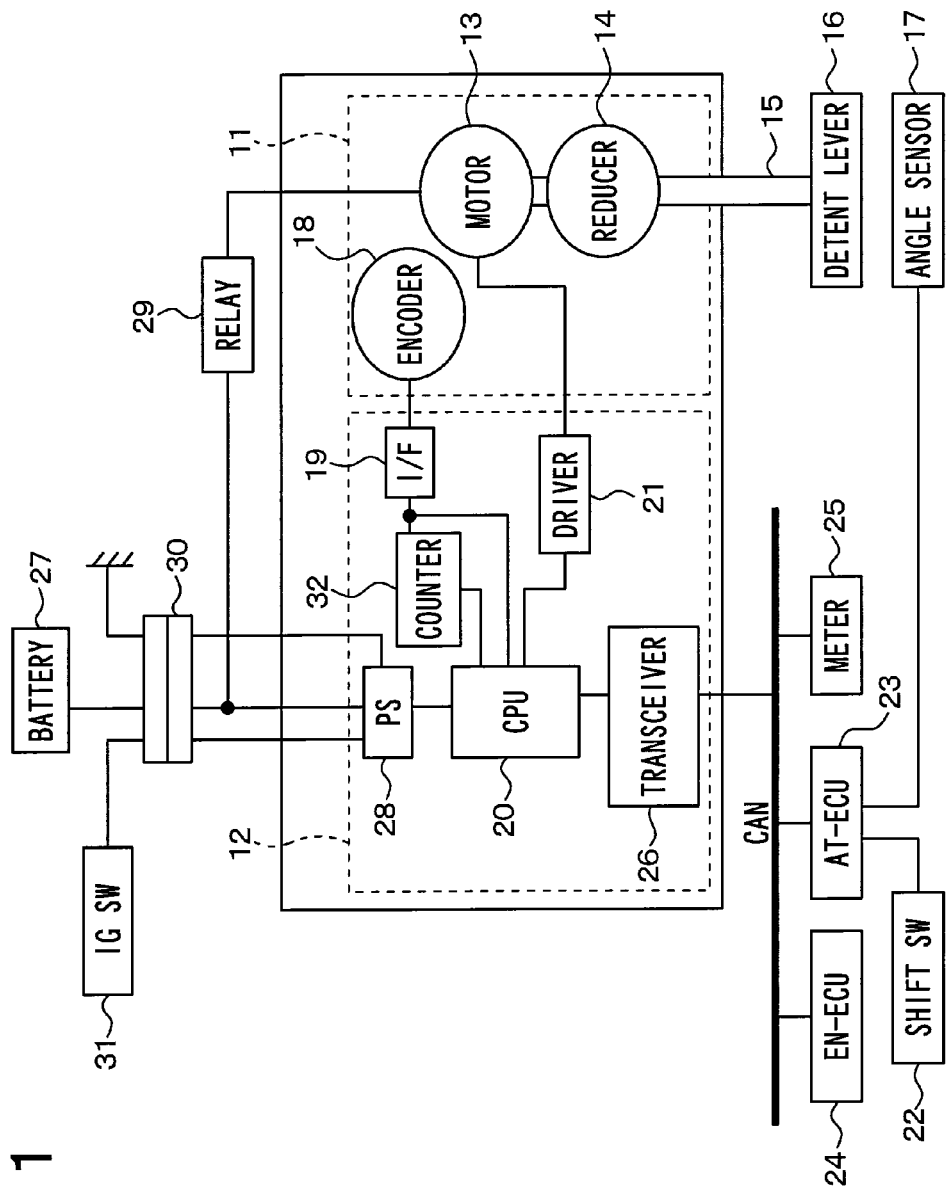
FIG. 1 is a diagram illustrating a shift-by-wire system according to a first embodiment of the present disclosure.
Figure 2:
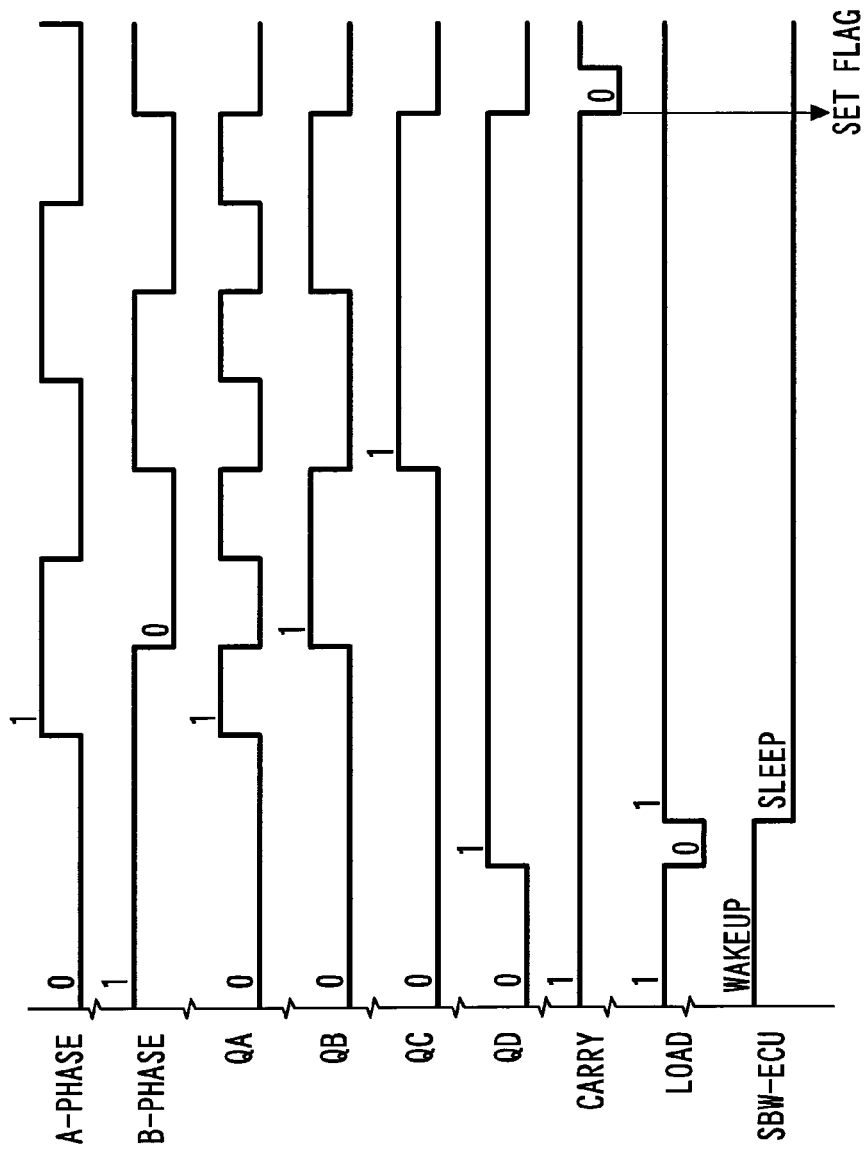
FIG. 2 is a timing diagram of an encoder counter.

Embodiments of the present disclosure are described below with reference to the drawings in which like characters of reference indicate the same or equivalent parts.

A first embodiment of the present disclosure is described below with reference to FIGS. 1-6.

Firstly, an overview of a shift-by-wire system is explained.

A range change mechanism 11 to change gear ranges in an automatic transmission of a vehicle is integrated with a shift-by-wire electronic control unit (SBW-ECU) 12 which controls the range change mechanism 11. The SBW-ECU 12 can serve as a motor control circuit recited in claims. The range change mechanism 11 is driven by a motor 13, for example, a switched reluctance motor (SRM). A rotating shaft of the motor 13 is coupled through a reducer 14 to a manual shaft 15, and a detent lever 16 as a control target to be controlled is fixed to the manual shaft 15.

The detent lever 16 is connected to a manual value (not shown) which moves linearly with rotation of the detent lever 16 to change hydraulic circuits in the automatic transmission, thereby changing the gear ranges. The detent lever 16 and other components including a detent spring (not shown) form a detent mechanism to engage a rotational position of the detent lever 16 with a position corresponding to each gear range (i.e., to keep the range change mechanism 11 at a position corresponding to each gear range).

A rotation angle (i.e., rotation position) of the manual shaft 15 or the detent lever 16 is detected by a rotation angle sensor 17, and an actual gear range can be checked through an output signal of the rotation angle sensor 17.

The range change mechanism 11 includes an encoder 18 to detect a rotation angle (i.e., rotation position) of the motor 13. For example, the encoder 18 can be a magnetic rotary encoder and output A-phase and B-phase pulse signals synchronously with rotation of the motor 13 at predetermined angles. The output signal of the rotary encoder 18 is inputted to a central processing unit (CPU) 20 through an interface (I/F) 19 of the SBW-ECU 12. The CPU 20 of the SBW-ECU 12 counts both rising and falling edges of the A-phase and B-phase signals outputted from the encoder 18. The CPU 20 causes a driver 21 to switch energization phases of the motor 13 in a predetermined sequence according to the number of counted edges (hereinafter referred to as the "encoder count value"), thereby driving and rotating the motor 13. In an example shown in FIG. 1, one motor 13 and one driver 21 are provided. Alternatively, two systems, each of which has three-phase (U, V, and W) windings of the motor 13 and the driver 21, can be provided in a redundant manner. In such an approach, even when one system breaks down, the motor can be driven and rotated by the other system.

During the rotation of the motor 13, a rotation direction of the motor 13 is determined based on the order in which the A-phase and B-phase signals appear. When the motor 13 rotates in a forward direction, the encoder count value is counted up. In contrast, when the motor 13 rotates in a reverse direction, the encoder count value is counted down. Thus, regardless of whether the motor 13 rotates in the forward direction or in the reverse direction, a relationship between the encoder count value and the rotation angle of the motor 13 is maintained unchanged. Therefore, regardless of the rotation direction of the motor 13, it is possible to detect the rotation position of the motor 13 based on the encoder count value and energize a phase winding corresponding to the detected rotation position so that the motor 13 can be driven and rotated.

The output signals of the rotation angle sensor 17 and a shift switch 22 to detect a position of a shift lever are inputted to an AT-ECU 23 which controls a transmission operation of the automatic transmission. Through controller area network (CAN) communication or the like, the SBW-ECU 12 exchanges necessary information with the AT-ECU 23, an engine ECU 24 to control an engine, and a meter 25. The output signals of the rotation angle sensor 17 and the shift switch 22 inputted to the AT-ECU 23 are inputted to the CPU 20 through a transceiver 26 of the SBW-ECU 12. The CPU 20 of the SBW-ECU 12 changes a target range according to the position of the shift lever operated by a driver and changes the gear ranges by driving and rotating the motor 13 according to the target range.

A power supply voltage from a battery 27 mounted on the vehicle is supplied to the CPU 20 through a power supply circuit 28 (e.g., regulator) of the SBW-ECU 12 and also supplied to the motor 13 through a relay 29. The power supply circuit 28 of the SBW-ECU 12 is electrically and detachably connected to the battery 27 and an ignition switch (IG) switch 31 of the vehicle through a power supply connector 30.

The encoder count value is stored in a random access memory (RAM) of the SBW-ECU 12. Therefore, when the SBW-ECU 12 is powered OFF, the stored encoder count value disappears. Accordingly, the encoder count value observed immediately after the SBW-ECU 12 is powered ON does not correspond to an actual rotation position (i.e., energization phase) of the motor 13. For this reason, to change the energization phase according to the encoder count value, it is necessary to cause the encoder count value to correspond to the actual rotation position of the motor 13 just after the SBW-ECU 12 is powered ON, thereby causing the encoder count value to correspond to the energization phase.

In view of the above, when being powered ON, the SBW-ECU 12 performs an energization phase learning process to learn a relationship between the energization phase and the encoder count value by performing an initial drive of the motor 13. In the initial drive, each phase is energized once in turn by open-loop control according to a predetermined time schedule. Thus, the rotation position of the motor 13 matches any one of the energization phases before the initial drive is ended. After the rotation position of the motor 13 matches any one of the energization phases, the motor 13 rotates synchronously with the change in the energization phase, and the encoder 18 outputs the A-phase and B-phase pulse signals synchronously with the rotation of the motor 13. The edges of the A-phase and B-phase pulse signals are counted during the initial drive, and a relationship between the encoder count value, the rotation position of the motor 13, and the energization phase at the time of the end of the initial drive is learned.

The SBW-ECU 12 detects only the amount of rotation from an activation position of the motor 13 based on the encoder count value after the motor 13 is activated. Therefore, there is a need to detect an absolute rotation position of the motor 13 in order to accurately rotate the motor 13 to a target position.

For this reason, the SBW-ECU 12 performs a strike control process in addition to energization phase learning process to learn a reference position of the motor 13. In the strike control process, the motor 13 is rotated until the range change mechanism 11 strikes a limit of its movable area. The rotation position of the motor 13 when the range change mechanism 11 strikes the limit is learned as the reference position of the motor 13. The rotation amount (i.e., rotation angle) of the motor 13 is controlled with respect to the encoder count value obtained when the motor 13 is at the reference position. The energization phase learning process and the strike control process are hereinafter sometimes collectively referred to as the "reference position learning process".

When the target range is changed according to the position of the shift lever operated by the driver after the reference position is learned, the SBW-ECU 12 changes the gear range to the target range (i.e., changes the switching position of the range change mechanism 11 to a position corresponding to the target range) by performing a feedback control process. In the feedback control process, the SBW-ECU 12 changes a target rotation position (i.e., target count value) according to a change in the target range and sequentially changes the energization phase of the motor 13 based on the encoder count value, thereby driving and rotating the motor 13 to the target rotation position.

The SBW-ECU 12 switches from a wakeup mode (i.e., active mode) to a sleep mode (i.e., low-power-consumption mode) after finishing rotating the motor 13. Then, when the driver operates the shift lever, and accordingly the output signal of the shift switch 22 changes, the SBW-ECU 12 returns to the wakeup mode. If the IG switch 31 is turned OFF after the SBW-ECU 12 finishes rotating the motor 13, the SBW-ECU 12 returns to the wakeup mode when the IG switch 31 is turned ON again.

The SBW-ECU 12 has an encoder counter 32 to count the output signal of the encoder 18 during a period of time where the SBW-ECU 12 is in the sleep mode. An operation of the encoder counter 32 is described below with reference to FIG. 2. The encoder counter 32 inverts a QA signal each time the A-phase signal or the B-phase signal outputted from the encoder 18 is inverted. Further, the encoder counter 32 inverts a QB signal each time the QA signal is inverted in a predetermined direction (e.g., from "1" to "0"). Furthermore, the encoder counter 32 inverts a QC signal each time the QB signal is inverted in a predetermined direction (e.g., from "1" to "0"). In addition, Further, the encoder counter 32 inverts a QD signal each time the QC signal is inverted in a predetermined direction (e.g., from "1" to "0"). In this way, the encoder counter 32 counts the rising and falling edges of the A-phase and B-phase signals. When the motor 13 rotates in a forward direction, the encoder counter 32 counts up, and when the motor 13 rotates in a reverse direction, the encoder counter 32 counts down. When a change (i.e., increase or decrease) in the count value of the encoder counter 32 reaches a predetermined value, it is determined that the encoder counter 32 overflows, and a CARRY signal is changed from "1" to "0". At this time, the SBW-ECU 12 returns to the wakeup mode from the sleep mode temporarily and sets an overflow flag in a RAM or the like to store the fact that the encoder counter 32 overflows It is noted that even after the SBW-ECU 12 finishes rotating the motor 13, the rotation position of the motor 13 may be displaced a little by the detent mechanism, which keeps the range change mechanism 11 at a position corresponding to each gear range, so that the output signal of the encoder 18 may be changed accordingly.

In view of such concerns, according to the first embodiment, the SBW-ECU 12 performs a predetermined control process so that the SBW-ECU 12 can switch to the sleep mode when a predetermined time, which is necessary for the rotation position of the motor 13 to be stable, elapses after finishing rotating the motor 13. Alternatively, the SBW-ECU 12 can switch to the sleep mode when making sure that the rotation position of the motor 13 is stable after finishing rotating the motor 13. Thus, even when the rotation position of the motor 13 is displaced a little by the detent mechanism after the SBW-ECU 12 finishes rotating the motor 13, and the output signal of the encoder 18 is changed accordingly, the SBW-ECU 12 can switch to the sleep mode from the wakeup mode after the output signal is changed.

Figure 3:
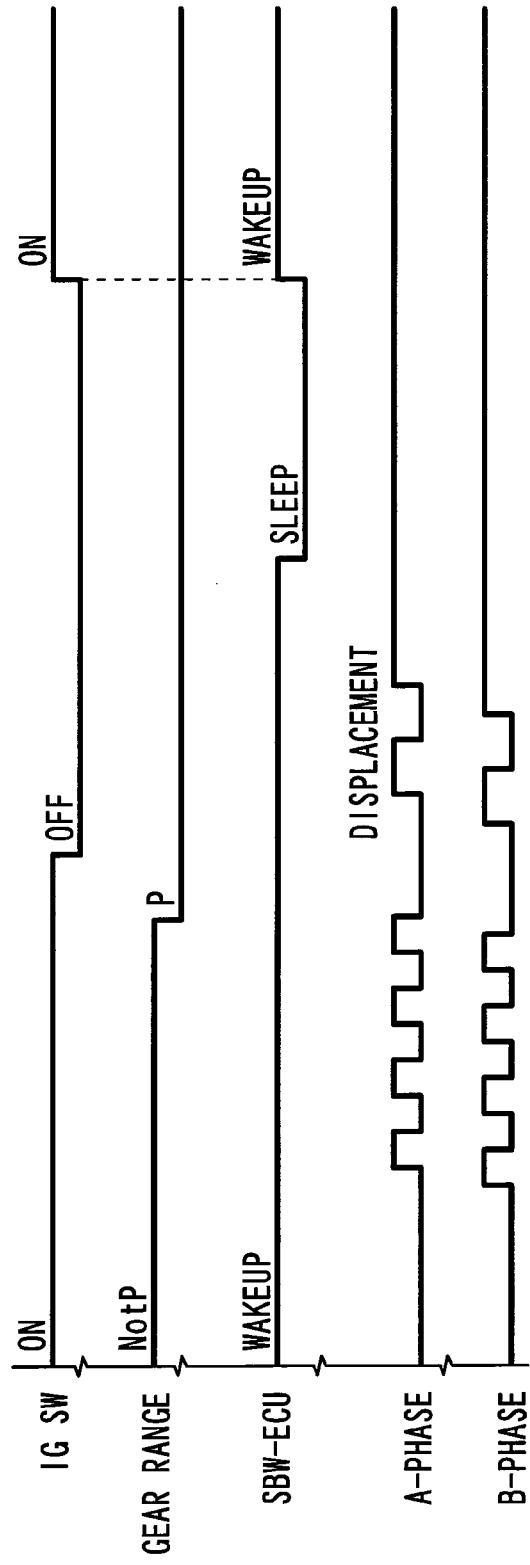
FIG. 3 is a timing diagram of the system observed when the encoder counter does not overflow during a period of time where a SBW-ECU is in the sleep mode.
Figure 4:
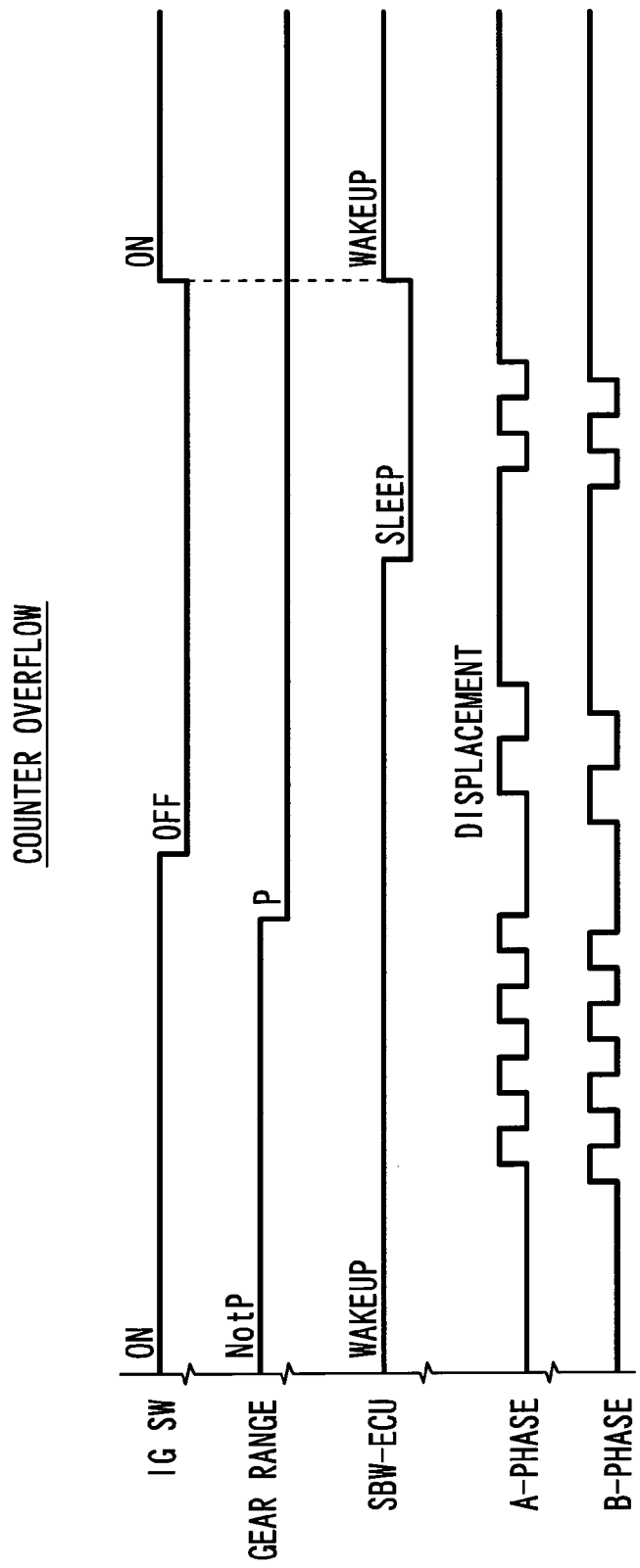
FIG. 4 is a timing diagram of the system observed when the encoder counter overflows during a period of time where the SBW-ECU is in the sleep mode.
Figure 5:
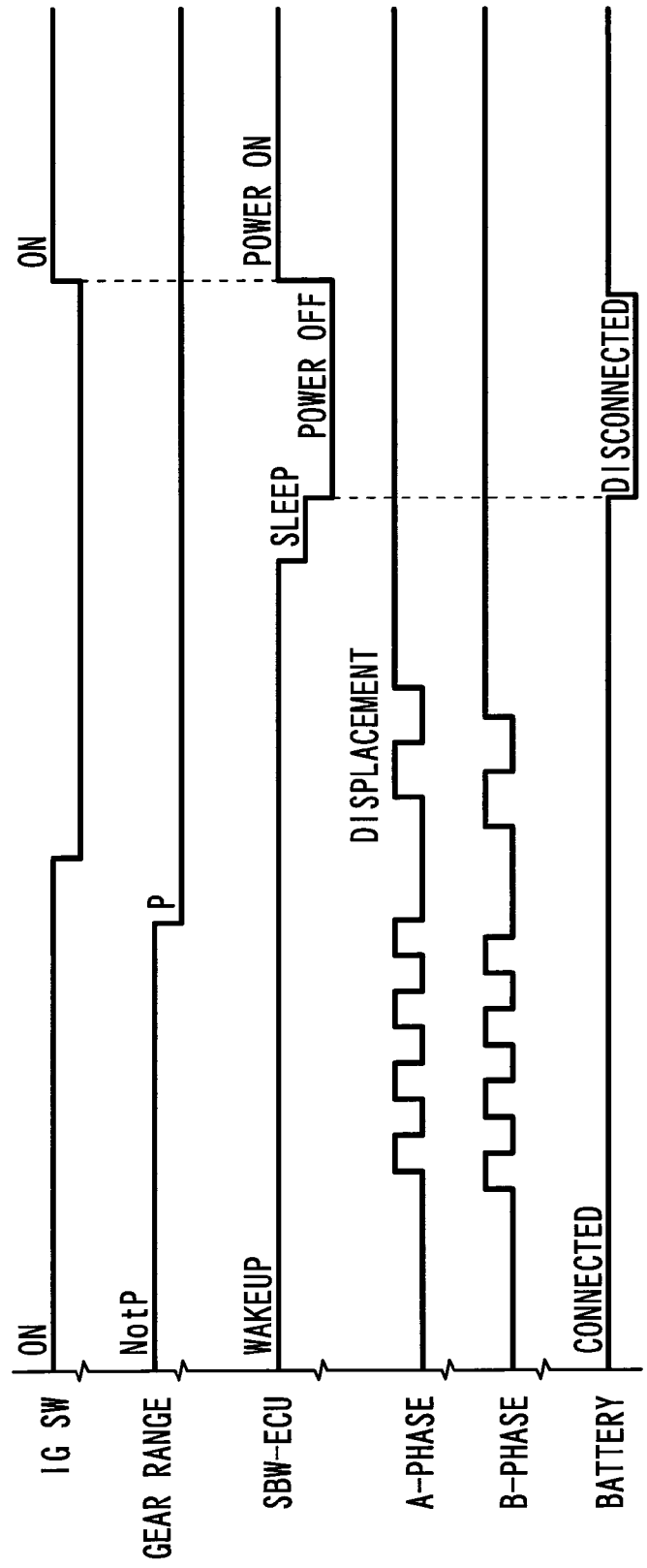
FIG. 5 is a timing diagram of the system observed when a power supply connector is disconnected from and then connected back to the SBW-ECU or a battery during a period of time where the SBW-ECU is in the sleep mode.

Specifically, as shown in FIGS. 3, 4, and 5, when the target range is changed, the SBW-ECU 12 changes the target rotation position (i.e., target count value) according to a change in the target range and sequentially changes the energization phase of the motor 13 based on the encoder count value, thereby rotating the motor 13 to the target rotation position. Thus, the SBW-ECU 12 changes the gear ranges from the previous target range (e.g., range other than parking range) to the present target range (e.g., parking range). In FIGS. 3, 4, and 5, "NotP" represents a range other than a park range, and "P" represents a park range.

Then, the SBW-ECU 12 switches from the wakeup mode to the sleep mode when a predetermined time elapses after finishing rotating the motor 13. The predetermined time is a time necessary for the rotation position of the motor 13 to be stable. For example, the predetermined time can be a time necessary for a displacement in the rotation position of the motor 13 by the detent mechanism to become zero.

Alternatively, the SBW-ECU 12 can switch from the wakeup mode to the sleep mode when making sure that the rotation position of the motor 13 is stable after finishing rotating the motor 13. For example, the SBW-ECU 12 can make sure whether the rotation position of the motor 13 is stable by determining whether the rotation position of the motor 13 (i.e., encoder count value) remains unchanged for a predetermined time.

The SBW-ECU 12 stores the present encoder count value in a data storage such as a random access memory (RAM) immediately before switching from the wakeup mode to the sleep mode. As mentioned previously, the encoder counter 32 counts the output signal of the encoder 18 during a period of time where the SBW-ECU 12 is in the sleep mode.

FIG. 3 shows a first case where the encoder counter 32 does not overflow during a period of time where the SBW-ECU 12 is in the sleep mode. That is, the first case is where the change in the count value of the encoder counter 32 during a period of time where the SBW-ECU 12 is in the sleep mode is smaller than a predetermined value. In the first case, the SBW-ECU 12 does not perform the reference position learning process to learn the reference position when returning to the wakeup mode from the sleep mode. In this case, the SBW-ECU 12 calculates the present encoder count value by adding the count value of the encoder counter 32 to the encoder count value stored in the data storage just before switching to the sleep mode.

FIG. 4 shows a second case where the encoder counter 32 overflows during a period of time where the SBW-ECU 12 is in the sleep mode. That is, the second case is where the change in the count value of the encoder counter 32 during a period of time where the SBW-ECU 12 is in the sleep mode is not smaller than the predetermined value. In the second case, the SBW-ECU 12 determines that an error may occur in the encoder count value and performs the reference position learning process to learn the reference position when returning to the wakeup mode from the sleep mode. Thus, the encoder count value is reset to a correct encoder count value.

Here, it is assumed that the shift-by-wire system undergoes repair or inspection during a period of time where the SBW-ECU 12 is in the sleep mode. In this case, an error may occur in the encoder count value, for example, due to a variation in the rotation position of the motor 13 and due to interruption of power supply from the battery 27 in the event of repair or inspection.

To prevent such an error, the SBW-ECU 12 determines whether the power supply connector 30 is disconnected from and then connected back to the SBW-ECU 12 or the battery 27 during a period of time where the SBW-ECU 12 is in the sleep mode, for example, by determining whether a connection to the battery 27 is interrupted temporarily. FIG. 5 shows a third case where the power supply connector 30 is disconnected from and then connected back to the SBW-ECU 12 or the battery 27 (i.e., the connection to the battery 27 is interrupted temporarily) during a period of time where the SBW-ECU 12 is in the sleep mode. In the third case, the SBW-ECU 12 performs the reference position learning process to learn the reference position when returning to the wakeup mode from the sleep mode. Thus, the encoder count value is reset to a correct encoder count value.

Figure 6:
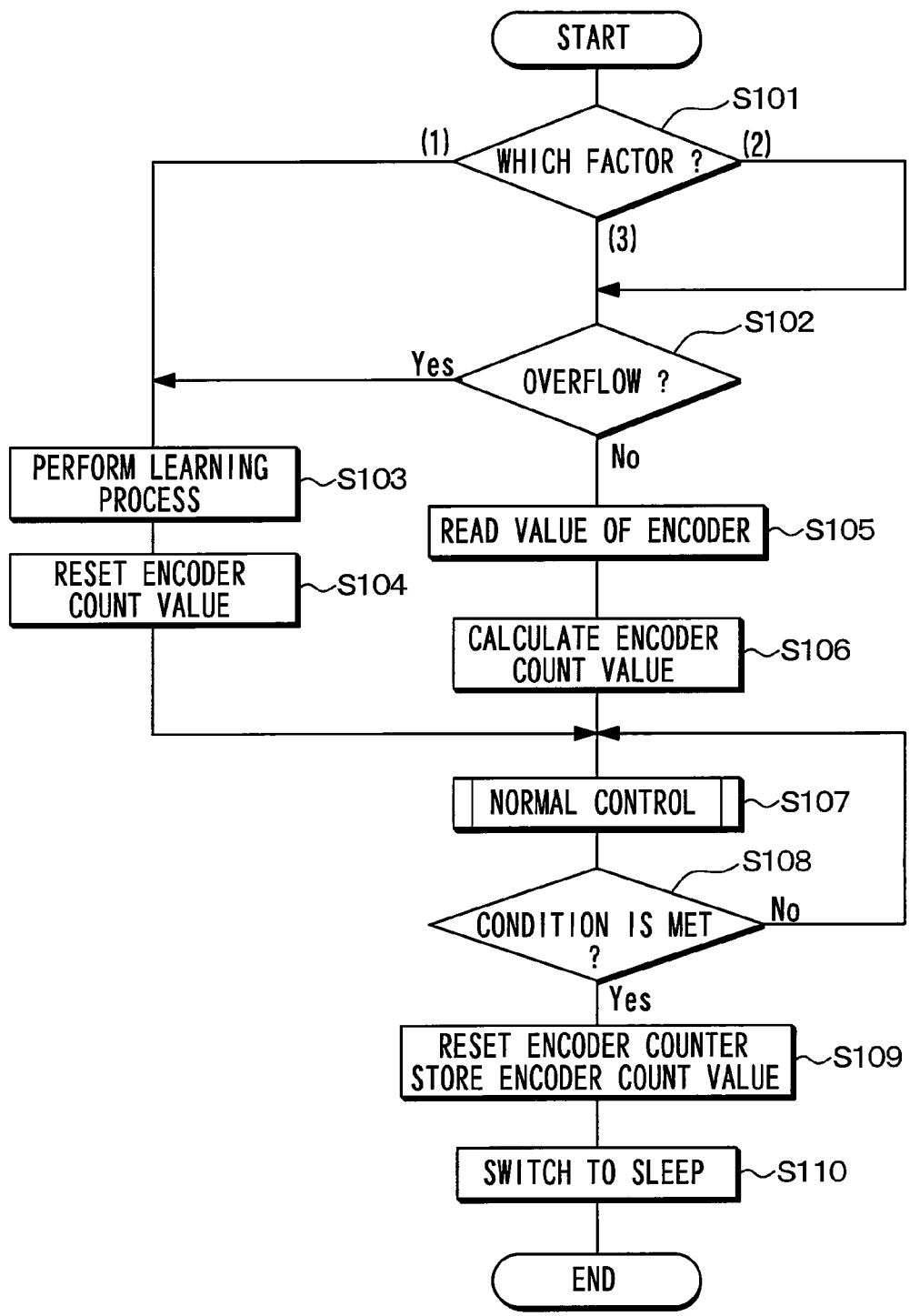
FIG. 6 is a flowchart of a control routine according to the first embodiment.

Next, a control routine performed by the SBW-ECU 12 according to the first embodiment is described with reference to FIG. 6. The SBW-ECU 12 repeatedly performs the control routine at a predetermined interval.

The control routine starts at S101 where it is determined which of the following three factors (1), (2), and (3) activates the control routine:

(1) The SBW-ECU 12 is powered ON (i.e., the SBW-ECU 12 is activated from a power OFF state).

(2) The SBW-ECU 12 wakes up in response to a change of the IG switch 31 from OFF to ON (i.e., the SBW-ECU 12 returns from the sleep mode to the wakeup mode).

(3) The SBW-ECU 12 wakes up in response to a signal received through CAN communication (i.e., the SBW-ECU 12 wakes up in response to a change in the output signal of the shift switch 22).

If it is determined at S101 that the control routine is activated by the factor (1), the control routine proceeds to S103 where the SBW-ECU 12 performs the reference position learning process to learn the reference position. After S103, the control routine proceeds to S104 where the SBW-ECU 12 resets the encoder count value based on the encoder count value obtained when the motor 13 is at the reference position.

It is noted that when the SBW-ECU 12 is activated after the power supply connector 30 is disconnected from and then connected back to the SBW-ECU 12 or the battery 27 (i.e., the connection to the battery 27 is interrupted temporarily) during a period of time where the SBW-ECU 12 is in the sleep mode, it is determined at S101 that the factor (1) activates the control routine.

If it is determined at S101 that the control routine is activated by the factor (2) or (3), the control routine proceeds to S102 where the SBW-ECU 12 determines whether the encoder counter 32 overflows. That is, at S102, the SBW-ECU 12 determines whether the amount of change in the count value of the encoder counter 32 during a period of time where the SBW-ECU 12 is in the sleep mode is not smaller than the predetermined value.

If the SBW-ECU 12 determines that the encoder counter 32 does not overflow corresponding to NO at S102, the control procedure proceeds to S105 where the SBW-ECU 12 reads the count value of the encoder counter 32. Then, the control routine proceeds from S105 to S106 where the SBW-ECU 12 calculates the present encoder count value by adding the count value of the encoder counter 32 read at S105 to the encoder count value stored in the data storage just before switching to the sleep mode.

In contrast, if the SBW-ECU 12 determines that the encoder counter 32 overflows corresponding to YES at S102, the control procedure proceeds to S103 where the SBW-ECU 12 performs the reference position learning process to learn the reference position. Then, the control routine proceeds from S103 to S104 where the SBW-ECU 12 resets the encoder count value based on the encoder count value obtained when the motor 13 is at the reference position.

After the encoder count value is set at S104 or S106, the control routine proceeds to S107 where the SBW-ECU 12 performs the feedback control process. As mentioned previously, in the feedback control process, when the target range is changed according to the position of the shift lever operated by the driver, the SBW-ECU 12 changes the target rotation position (i.e., target count value) according to the change in the target range and sequentially changes the energization phase of the motor 13 based on the encoder count value, thereby rotating the motor 13 to the target rotation position.

Then, the control routine proceeds from S107 to S108 where the SBW-ECU 12 determines whether a predetermined sleep condition is met. For example, at S108, the SBW-ECU 12 determines whether the sleep condition is met by determining whether a predetermined time elapses after finishing rotating the motor 13. The predetermined time is a time necessary for the rotation position of the motor 13 to be stable. For example, the predetermined time can be a time necessary for a displacement in the rotation position of the motor 13 by the detent mechanism to become zero.

Alternatively, at S108, the SBW-ECU 12 determines whether the sleep condition is met by determining whether the rotation position of the motor 13 is stable after finishing rotating the motor 13. For example, the SBW-ECU 12 can determine whether the rotation position of the motor 13 is stable by determining whether the rotation position of the motor 13 (i.e., encoder count value) remains unchanged for a predetermined time.

If the SBW-ECU 12 determines that the sleep condition is not met corresponding to NO at S108, the control routine returns to S107. In contrast, if the SBW-ECU 12 determines that the sleep condition is met corresponding to YES at S108, the control routine proceeds to S109. At S109, the SBW-ECU 12 resets the encoder counter 32 and stores the present encoder count value, which is obtained just before switching to the sleep mode, in the data storage. Then, the control routine proceeds from S109 to S110 where the SBW-ECU 12 switches to the sleep mode so that the control routine can be ended.

As described above, according to the first embodiment, the SBW-ECU 12 switches to the sleep mode when the predetermined time, which is necessary for the rotation position of the motor 13 to be stable, elapses after finishing rotating the motor 13 or when making sure that the rotation position of the motor 13 is stable after finishing rotating the motor 13. Thus, even when the rotation position of the motor 13 is displaced a little by the detent mechanism after the SBW-ECU 12 finishes rotating the motor 13, and the output signal of the encoder 18 is changed accordingly, the SBW-ECU 12 can switch to the sleep mode after the output signals are changed. Therefore, it is possible to reduce a risk that the output signals of the encoder 18 are changed during a period of time where the SBW-ECU 12 is in the sleep mode. Accordingly, the number of times the reference position learning process is performed can be reduced effectively. Further, after switching to the sleep mode, the SBW-ECU 12 does not always switch to the wakeup mode each time the output signal of the encoder 18 is changed. Accordingly, power consumption can be reduced.

Further, according to the first embodiment, the SBW-ECU 12 has the encoder counter 32 to count the output signal of the encoder 18 during a period of time where the SBW-ECU 12 is in the sleep mode. Thus, even when the rotation position of the motor 13 is changed a little by external force such as vibration during a period of time where the SBW-ECU 12 is in the sleep mode, and the output signal of the encoder 18 is changed accordingly, the SBW-ECU 12 can obtain a correct encoder count value when returning to the wakeup mode.

In the conventional technique disclosed in JP-A-2012-170213, the change in the output signal of the encoder during a period of time where the microcomputer is in the sleep mode is detected by comparing the A-phase signal and the B-phase signal of the encoder before and after the microcomputer switches to the sleep mode. Therefore, a detection error may be caused when the output signal of the encoder changes three or more times. For example, in the conventional technique, it is impossible to distinguish when the output signal changes once from when the output signal changes three times.

Regarding this concern, according to the first embodiment, the SBW-ECU 12 has the encoder counter 32 to count the output signal of the encoder 18 during a period of time where the SBW-ECU 12 is in the sleep mode. Thus, even when the output signal of the encoder 18 changes three or more times during a period of time where the SBW-ECU 12 is in the sleep mode, the encoder count value can be obtained correctly.

Further, according to the first embodiment, when the change in the count value of the encoder counter 32 during a period of time where the SBW-ECU 12 is in the sleep mode is smaller than a predetermined value, the SBW-ECU 12 does not perform the reference position learning process when returning to the wakeup mode. Thus, the number of times the reference position learning process is performed can be reduced effectively.

In contrast, when the change in the count value of the encoder counter 32 during a period of time where the SBW-ECU 12 is in the sleep mode is not smaller than the predetermined value, the SBW-ECU 12 performs the reference position learning process when returning to the wakeup mode. That is, when the amount of change in the count value of the encoder counter 32 during a period of time where the SBW-ECU 12 is in the sleep mode is not smaller than the predetermined value, the SBW-ECU 12 determines that an error may occur in the encoder count value and performs the reference position learning process when returning to the wakeup mode from the sleep mode. Thus, the encoder count value is reset to a correct encoder count value.

Furthermore, according to the first embodiment, when the power supply connector 30 is disconnected from and then connected back to the SBW-ECU 12 or the battery 27 (i.e., the connection to the battery 27 is interrupted temporarily) during a period of time where the SBW-ECU 12 is in the sleep mode, the SBW-ECU 12 performs the reference position learning process when returning to the wakeup mode. That is, when the power supply connector 30 is disconnected from and then connected back to the SBW-ECU 12 or the battery 27 during a period of time where the SBW-ECU 12 is in the sleep mode, the SBW-ECU 12 determines that an error may occur in the encoder count value, for example, in the event of repair or inspection and performs the reference position learning process when returning to the wakeup mode. Thus, the encoder count value is reset to a correct encoder count value.

Second Embodiment

Next, a second embodiment of the present disclosure is described below with reference to FIGS. 7 and 8. The second embodiment differs from the first embodiment as follows.

Figure 7:
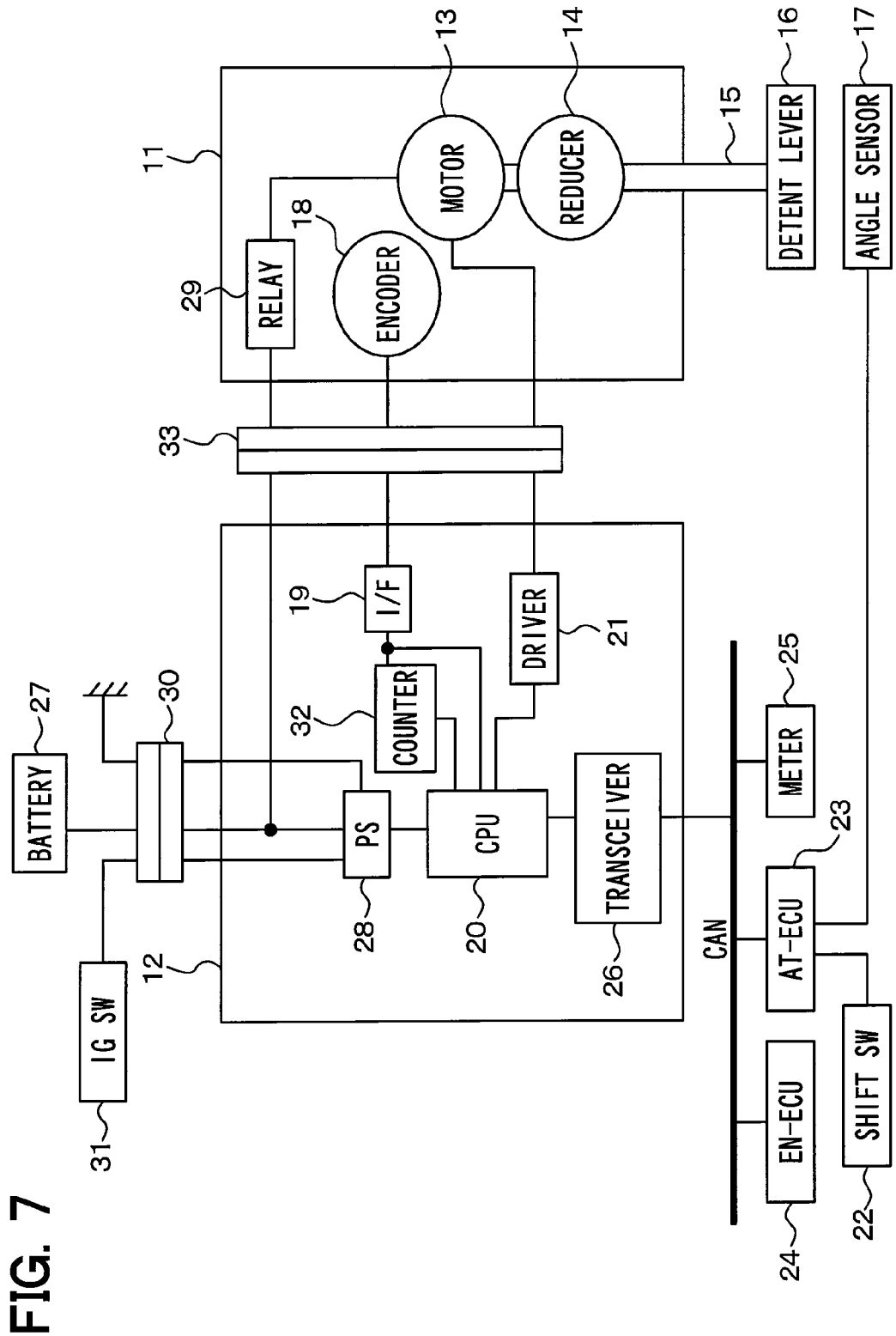
FIG. 7 is a diagram illustrating a shift-by-wire system according to a second embodiment of the present disclosure.
Figure 8:
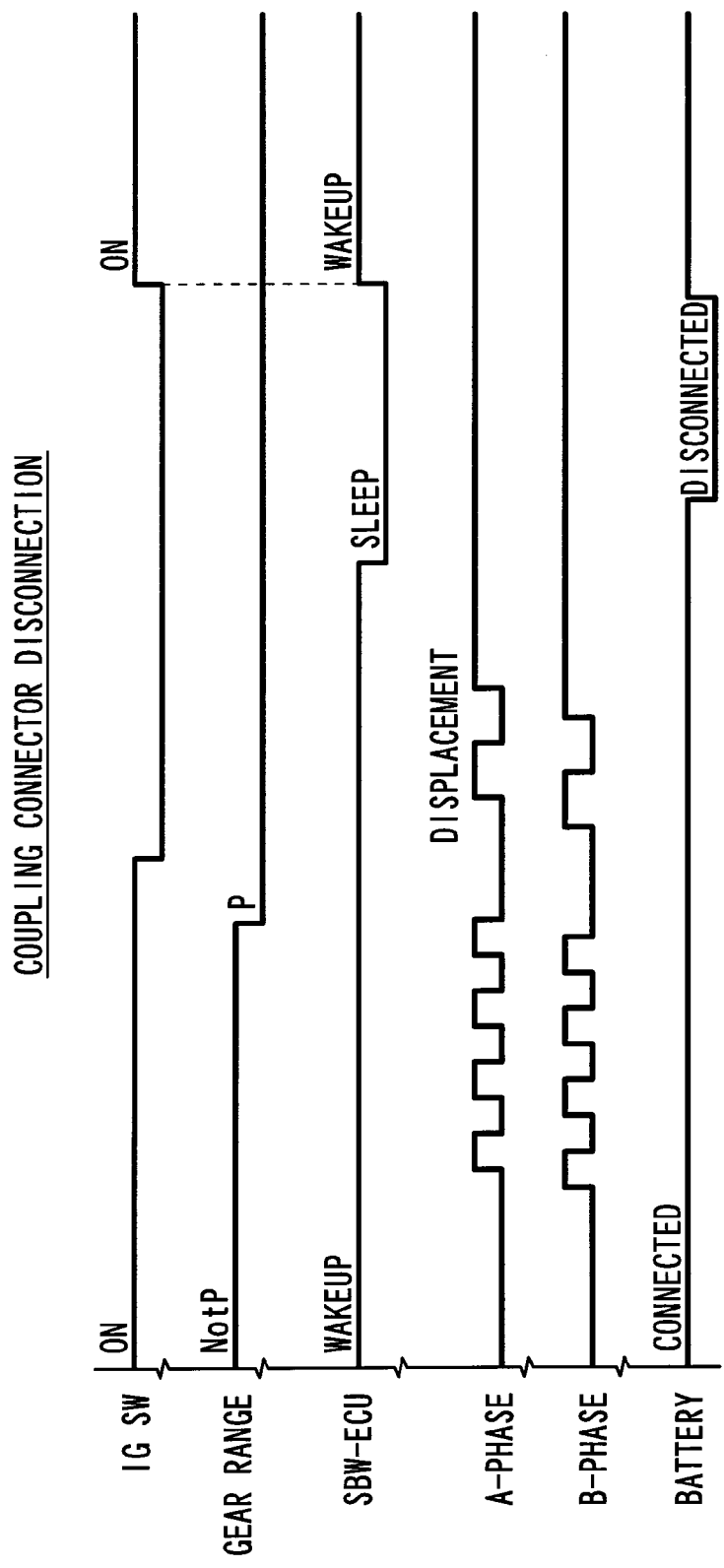
FIG. 8 is a timing diagram of the system according to the second embodiment observed when a coupling connector is disconnected from and then connected back to a SBW-ECU or at least one of a motor and an encoder during a period of time where the SBW-ECU is in the sleep mode.

As shown in FIG. 7, according to the second embodiment, the range change mechanism 11 including the motor 13 and the encoder 18 is separate from the SBW-ECU 12 and electrically connected through a coupling connector 33 to the SBW-ECU 12.

The SBW-ECU 12 determines whether the coupling connector 33 is disconnected from and then connected back to the SBW-ECU 12 or the range change mechanism 11 in the event of repair or inspection during a period of time where the SBW-ECU 12 is in the sleep mode, for example, by determining whether a connection to the encoder 18 is interrupted temporarily. FIG. 5 shows a case where the coupling connector 33 is disconnected from and then connected back to the SBW-ECU 12 or the range change mechanism 11 (i.e., the connection to the encoder 18 is interrupted temporarily) during a period of time where the SBW-ECU 12 is in the sleep mode. In this case, the SBW-ECU 12 performs the reference position learning process to learn the reference position when returning to the wakeup mode.

When the coupling connector 33 is disconnected from and then connected back to the SBW-ECU 12 or the range change mechanism 11 in the event of repair or inspection of the system or in the event of replacement of the range change mechanism 11, an error may occur in the encoder count value. For this reason, according to the second embodiment, when the coupling connector 33 is disconnected from and then connected back to the SBW-ECU 12 or the range change mechanism 11 during a period of time where the SBW-ECU 12 is in the sleep mode, the SBW-ECU 12 performs the reference position learning process to learn the reference position when returning to the wakeup mode. Thus, the encoder count value is reset to a correct encoder count value.

(Modifications)

While the present disclosure has been described with reference to the embodiments, it is to be understood that the disclosure is not limited to the embodiments. The present disclosure is intended to cover various modifications and equivalent arrangements within the spirit and scope of the present disclosure. For example, the embodiments can be modified as follows.

In the embodiments, the SBW-ECU 12 has the encoder counter 32 to count the output signal of the encoder 18 during a period of time where the SBW-ECU 12 is in the sleep mode. However, it is not always necessary that the SBW-ECU 12 has the encoder counter 32. If the SBW-ECU 12 does not have the encoder counter 32, and the output signal of the encoder 18 is changed during a period of time where the SBW-ECU 12 is in the sleep mode, the SBW-ECU 12 may preferably perform the reference position learning process when returning to the wakeup mode.

In the embodiments, the encoder 18 is a magnetic encoder. Alternatively, the encoder 18 can be another type of encoder such as an optical encoder or a brush encoder. Further, the encoder 18 is not limited to an encoder which outputs an A-phase signal and a B-phase signal. For example, the encoder 18 can be an encoder which outputs a Z-phase signal for correction (i.e., for an index) in addition to an A-phase signal and a B-phase signal.

In the embodiments, the motor 13 is a switched reluctance motor (SRM). Alternatively, the motor 13 can be another type of brushless synchronous motor whose rotation position can be detected based on a count value of a rotary encoder and whose energization phase can be sequentially changed based on the rotation position.

In the embodiments, the system to which the present disclosure is applied has the range change mechanism 11 which changes a gear range between two ranges: P range and NotP range. Alternatively, a system to which the present disclosure is applied can have a range change mechanism which changes a gear range among more than two ranges. For example, a system to which the present disclosure is applied can have a range change mechanism which changes a gear range among four ranges: P (park) range, R (reverse) range, N (neutral) range, and D (drive) range.

Application of the present disclosure is not limited to a range change mechanism configured to change a gear range in a vehicle automatic transmission including continuously variable transmission (CVT) and dual clutch transmission (DCT). For example, the present disclosure can be applied to a range change mechanism configured to change a gear range in a reducer of an electric vehicle.

Further, application of the present disclosure is not limited to a range change mechanism, but includes a position change mechanism driven by a motor.

Such changes and modifications are to be understood as being within the scope of the present invention as defined by the appended claims.

What is claimed is:

1. A motor controller comprising:
   a motor that drives a target object to be controlled;
   an encoder that outputs a pulse signal synchronously with rotation of the motor, and
   a control circuit that rotates the motor based on a count value of the pulse signal, wherein
   the control circuit switches to a sleep mode when making sure that a rotation position of the motor is stable after finishing rotating the motor or when a predetermined time necessary for the rotation position of the motor to be stable elapses after finishing rotating the motor, and
   when a change in the pulse signal during a period of time where the control circuit is in the sleep mode is not smaller than a predetermined amount, the control circuit performs a reference position learning process to learn a reference position of the motor by rotating the motor when returning to a wakeup mode from the sleep mode.

2. The motor controller according to claim 1, further comprising:
   an encoder counter that counts the pulse signal outputted from the encoder during the period of time where the control circuit is in the sleep mode, wherein
   when a change in a count value of the encoder counter during the period of time where the control circuit is in the sleep mode is smaller than a predetermined value, the control circuit does not perform the reference position learning process when returning to the wakeup mode.

3. The motor controller according to claim 2, wherein
   when the change in the count value of the encoder counter during the period of time where the control circuit is in the sleep mode is not smaller than the predetermined value, the control circuit performs the reference position learning process when returning to the wakeup mode.

4. The motor controller according to claim 1, wherein
   the motor control circuit is electrically connected to a battery through a connector, and
   when the connector is disconnected from and connected back to the motor control circuit or the battery during the period of time where the control circuit is in the sleep mode, the control circuit performs the reference position learning process when returning to the wakeup mode.

5. The motor controller according to claim 1, wherein
   the motor control circuit is electrically connected to at least one of the motor and the encoder through a connector, and
   when the connector is disconnected from and connected back to the motor control circuit or the at least one of the motor and the encoder during the period of time where the control circuit is in the sleep mode, the control circuit performs the reference position learning process when returning to the wakeup mode.

* * * * *